United States Patent
Buehler

(10) Patent No.: US 10,399,164 B2
(45) Date of Patent: Sep. 3, 2019

(54) METHOD AND PULSE-FORMING DEVICE FOR ELECTRICAL DISCHARGE MACHINING

(71) Applicant: Agie Charmilles SA, Losone (CH)

(72) Inventor: Sara Buehler, Losone (CH)

(73) Assignee: AGIE CHARMILLES SA, Losone (CH)

( * ) Notice: Subject to any disclaimer, the term of this patent is extended or adjusted under 35 U.S.C. 154(b) by 1036 days.

(21) Appl. No.: 14/822,910

(22) Filed: Aug. 11, 2015

(65) Prior Publication Data

US 2016/0052073 A1  Feb. 25, 2016

(30) Foreign Application Priority Data

Aug. 20, 2014  (EP) .................................. 14 181 529

(51) Int. Cl.
  *B23H 1/02* (2006.01)
  *B23H 11/00* (2006.01)
  *B23H 1/06* (2006.01)

(52) U.S. Cl.
  CPC .............. *B23H 1/022* (2013.01); *B23H 1/06* (2013.01); *B23H 11/006* (2013.01); *B23H 1/024* (2013.01); *B23H 2300/22* (2013.01); *B23H 2600/12* (2013.01)

(58) Field of Classification Search
  CPC .......... B23H 1/06; B23H 1/006; B23H 1/024; B23H 1/022; B23H 2300/22; B23H 2600/12

USPC ....................................................... 219/69.18
See application file for complete search history.

(56) References Cited

U.S. PATENT DOCUMENTS

| 3,033,971 A | 5/1962 | Pfau |
| 4,205,212 A | 5/1980 | Buhler et al. |
| 4,491,713 A | 1/1985 | Patton et al. |
| 5,585,014 A * | 12/1996 | Magara ................. B23H 1/022 219/69.13 |
| 2003/0006721 A1 | 1/2003 | Kinbara et al. |
| 2006/0006150 A1 * | 1/2006 | Hiraishi ................. B23H 1/022 219/69.13 |
| 2007/0289949 A1 * | 12/2007 | Suzuki .................... B23H 1/02 219/69.13 |

FOREIGN PATENT DOCUMENTS

| DE | 2653857 A1 | 2/1978 |
| DE | 3602848 A1 | 8/1987 |
| DE | 4422834 A1 | 1/1995 |
| EP | 1719570 A1 | 11/2006 |
| JP | 56119316 A | 9/1981 |

* cited by examiner

*Primary Examiner* — Brian W Jennison
(74) *Attorney, Agent, or Firm* — Leydig, Voit & Mayer, Ltd.

(57) ABSTRACT

A method for electrical discharge machining a work piece using rectangular processing pulses includes forming the rectangular processing pulses by discharging one or multiple discrete delay lines that comprise multiple storage elements. The storage elements are arranged as part of a feed line to a spark gap on a section of the feed line near the spark gap. The discrete delay lines are connected to a guide head by an electrode-side contact unit and are connected to the work piece by a work piece-side contact unit.

24 Claims, 9 Drawing Sheets

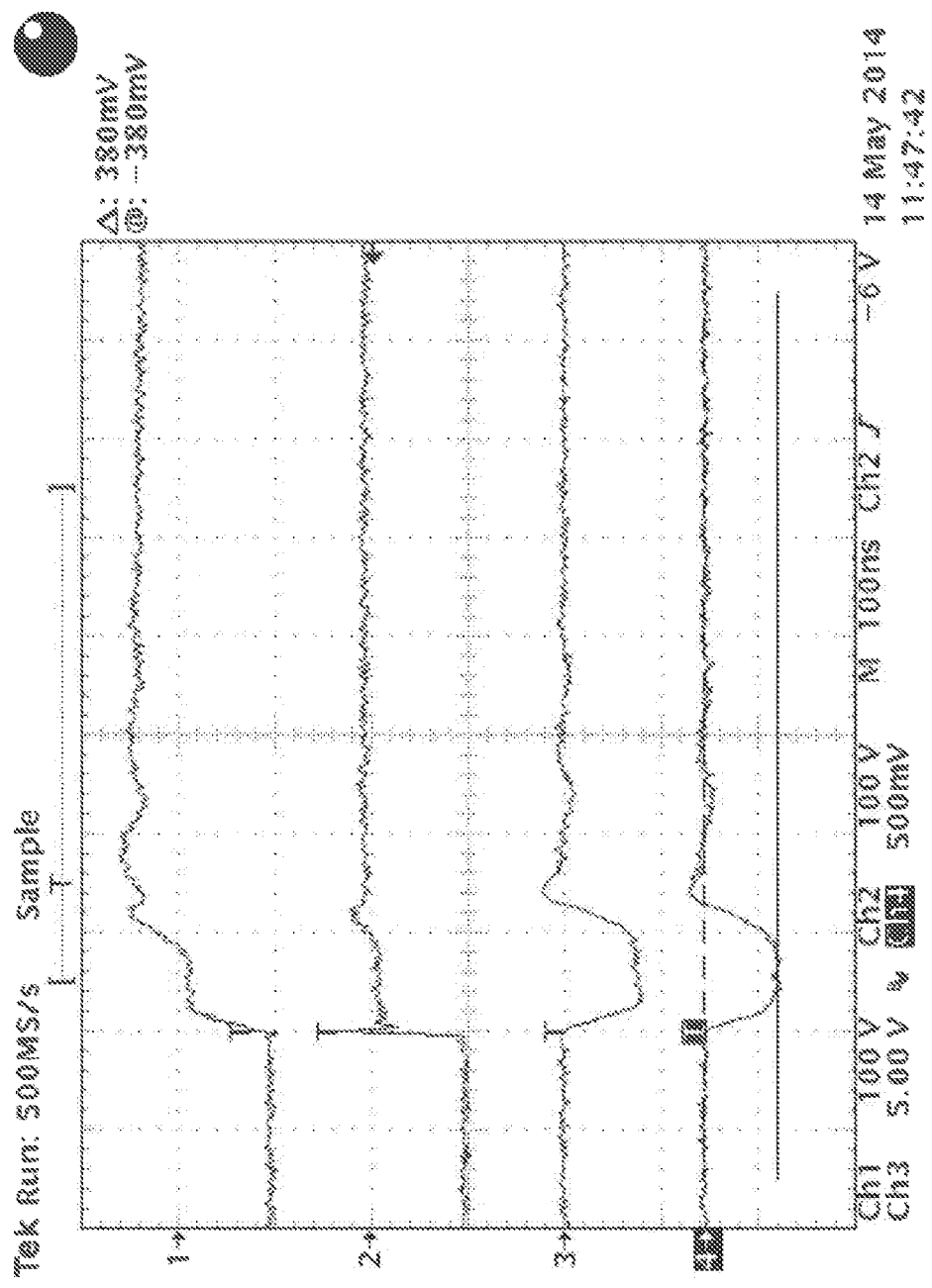

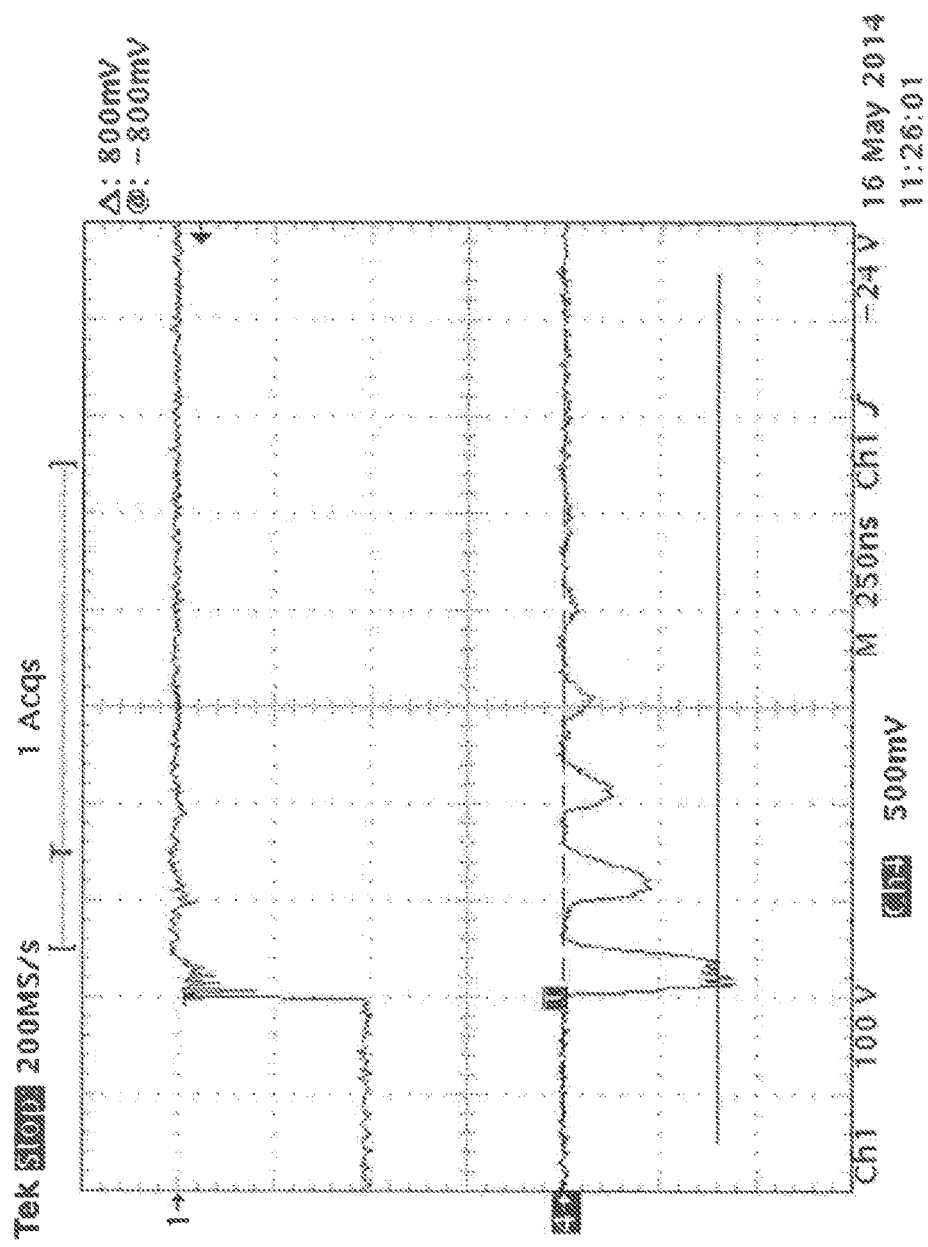

METHOD AND PULSE-FORMING DEVICE FOR ELECTRICAL DISCHARGE MACHINING

CROSS-REFERENCE TO PRIOR APPLICATION

Priority is claimed to European Patent Application No. 14 181 529.0, filed on Aug. 20, 2014, the entire disclosure of which is hereby incorporated by reference herein.

FIELD

The invention relates to a method and a pulse-forming device for electrical discharge machining used in drilling, die sinking, milling and wire-cutting processes in the field of producing the best surface quality and the highest degree of accuracy.

BACKGROUND

The manufacturers of machine tools that remove material from work pieces by means of electrical discharge machining are generally confronted with the problem that despite all their efforts when cabling the working area, it is very difficult to transmit short, rectangular processing pulses to the spark gap.

This is particularly the case for current amplitudes that are greater than approx. 5 A and pulse durations that are shorter than approx. 0.5 µs. The cause of a pulse deforming in a broadening and flattening manner is the parasitic leakage inductance between the pulse source and the spark discharge, which even in the best case could exceed 300 nH.

One option would be to increase the pulse source voltage but this is not possible because it must be possible to adjust the pulse voltage independently as it is one of the most important process parameters.

The physics involved in electrical discharge machining is particularly interesting in the range of pulse durations that are shorter than approx. 100 ns because below this limit the machining process changes from an in-part melting off process to a purely evaporating process, so-called ablation. The temperature gradient at the discharge site changes so abrupt that the work piece material does not experience any structural changes.

The condensate of this metal vapour is, insofar as it is not dissolved in the dielectric as metal oxide or metal hydroxide, only present in the dielectric as extremely fine grain particles. This leads to a further important advantage, namely to a suppression of the uncontrollable and damaging lateral discharges, across larger granules of eroded material, by way of example when precision drilling.

A similar development is recognized when considering the recent history of laser cutting that is closely related to electrical discharge machining. Partly unexpected good machining results relating to removal rate and surface quality were achieved using ever shorter beam pulses, down to femto seconds, and also higher pulse powers. Improvements occurs quantum related when discrete limit values for the pulse duration and beam power were exceeded.

With regard to the electrical discharge process that as far as the physical principle is concerned functions in a similar manner, the hitherto chosen path has been in the direction of ultra-short pulses for the above mentioned reasons. It follows from this that fundamentally new solutions are required in order to effectively reduce the parasitic leakage inductance at the discharge site.

Coaxial cables or also strip conductors have been used for almost 100 years as pulse-shaping devices. The main application fields have been in high energy physics for the nuclear research industry, ultrasound generators, and radar systems and in cell biology research.

JPS56-119316A from Mitsubishi discloses feed lines having in each case a capacitor. However, the rise times of a feed line having a capacitor are far too long. Rectangular pulses are likewise equally difficult to achieve.

FIG. 4 of the present application illustrates a known solution that uses coaxial cables. The patent EP 1 719 570 from the inventor D'Amario, wherein already existing power cables are used in an electrical discharge wire-cutting machine in an innovative manner as a pulse-forming device in order to achieve a specific pulse power of 100 kW/mm$^2$ Pulse currents of 36 A after 150 ns pulse duration or 43 A after 190 ns pulse duration are quoted and were found to be sufficient for use in the middle machining range prior to the polishing range.

D'Amario includes reference to the patent DE 26 53 857, Ullmann et al and in doing so refers to the fact that it is possible to further improve the current rise time by using sliding contacts.

It has likewise been known for a long time to use capacitor elements and inductance elements as delay elements arranged in rows as substitute homogenous delay lines, the so-called discrete delay lines.

Discrete delay lines were also proposed in the U.S. Pat. No. 3,033,971 from Pfau by way of example as early as 1957 for an electrical discharge generator that does not comprise any electronic switching means. The solution illustrated in FIG. 5 demonstrates a decoupling impedance R, L for charging the discrete delay line, and a saturable reactor Ls as a switching element. The voltage-time integral of the saturable reactor Ls can be varied by way of pre-magnetization. A resistor that is parallel to the spark gap ensures that saturation can occur in a stable manner in the event that the spark gap is in a very high ohmic state.

The poor scalability of all solutions that are based on coaxial cables or strip conductors must definitely be mentioned as a disadvantage of the prior art. If the object is to achieve namely higher pulse power-s-, then this solution is immediately extremely voluminous and cost-intensive.

The patent EP 1 719 570 from D'Amario makes an exception in this case because coincidentally the cables that are suitable for the object of his invention having a material value of approx. Euro 1,000.—were already available on the machine.

However, D'Amario also does not conceal in his patent EP 1 719 570 that theoretically he had expected a pulse of 50 A at 42 ns (accordingly to 1.2 A/ns) but had measured only a pulse of 36 A at 150 ns, (accordingly 0.24 A/ns). This was obviously absolutely sufficient to achieve the object of his invention, however, a consequent further development of electrical discharge technology demands more radical approaches.

The main reason why many solutions that use coaxial cable produce such unexpected poor results for the pulse shape resides in the inability to achieve an almost inductance-free connection between the bulky cables and the load. The lower the charging voltage is, the greater will be the inductance problem. It is therefore not surprising that a large portion of relevant publications refer only to theoretical simulations.

The main disadvantage of the generator in accordance with U.S. Pat. No. 3,033,971 from Pfau resides in the additional large residual inductance of the saturable reactor Ls in the saturated state that is also added to the leakage inductance of the cabling. As a result, this solution is completely unsuitable for generating extremely short pulses. Further disadvantages relate naturally also to the missing protection against short circuits and arcing on the spark gap, and also that the process parameters cannot be controlled independently.

SUMMARY

A method for electrical discharge machining a work piece using rectangular processing pulses includes forming the rectangular processing pulses by discharging one or multiple discrete delay lines that comprise multiple storage elements. The storage elements are arranged as part of a feed line to a spark gap on a section of the feed line near the spark gap. The discrete delay lines are connected to a guide head by an electrode-side contact unit and are connected to the work piece by a work piece-side contact unit.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 8a illustrates an example of a discharge pulse with a diode in the case of a source voltage of 100V.

FIG. 10b illustrates an example of a pulse train with two diodes in the case of a source voltage of 200V.

DETAILED DESCRIPTION

Figure 1:
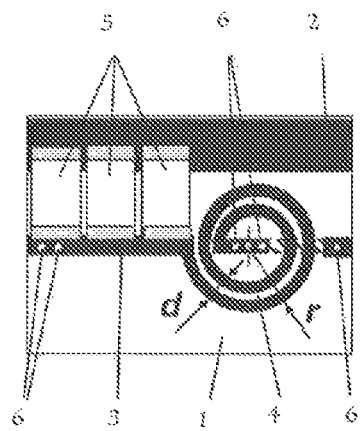
FIG. 1 illustrates a single storage element of a discrete delay line according to the method in accordance with the invention.

It is possible using the method in accordance with the invention and its corresponding pulse-forming device to generate shorter and more powerful pulses, which renders possible a marked progress in electrical discharge technology with respect to greater machining performance, finer outlines, improved surface quality and a greater degree of precision.

In comparison to the two known solutions using discrete delay lines and the sliding contact on the work piece, in the case of the solution in accordance with the invention the leakage inductance of the feed line to the spark gap is completely eliminated and the remaining small leakage inductance of the spark gap itself is treated as an integral component of the final storage element of the discrete delay line.

The method in accordance with the invention for the electrical discharge machining process for forming rectangular pulses by means of discharging discrete delay lines that comprise multiple storage elements can be characterized in that the storage elements are arranged as part of the feed line to a spark gap on a section of the feed line in the case of the spark gap and that the discrete delay line is connected to a guide head by way of an electrode-side contact unit and is connected to the work piece by way of a work piece-side contact unit. As a consequence, it is possible to generate shorter and more powerful pulses.

The invention further relates to a pulse-forming device for generating rectangular pulses for the electrical discharge machining process by means of a spark discharging process using discrete delay lines. This comprises multiple storage elements arranged in the form of a chain, wherein the storage elements are arranged as part of a band-shaped and flexible feed line to a spark gap in a printed or surface-mountable form on the section directly adjoined to a spark gap at the end of the band-shaped and flexible feed line, and that the discrete delay line comprises an electrode-side contact unit in order to produce or ensure an electrical contact and a mechanical holding arrangement and comprises a work piece-side contact unit that is in electrical contact with a work piece.

The invention is explained herein under with reference to multiple, feasible embodiments. It goes without saying that the invention is however not limited to these embodiments and application fields.

The described method in accordance with the invention and its pulse-forming devices are suitable in particular to manufacture delicate and very fine structures by means of electrical discharge machining.

Further application fields are in addition feasible. The invention is generally well suited to an equal extent for drilling, die sinking, milling and wire-cutting technologies that use electrical discharge machining. However, owing to the high stray capacitance between the electrode and the spark gap, the method is less suitable for die sink electrodes that have a large surface area, since a programmed pulse shape would likewise be deformed as a result of a very high stray capacitance of the discharge gap.

The main application field is consequently the manufacture of products such as spinning nozzles, fuel injection nozzles, cooling bore holes in turbo jet engines, but also in stamping-, drawing- and pressing-tools, and in the mass production of precision micro parts.

So-called discrete delay lines are ideally suitable in order to generate precise no-load voltage pulses of any shape and pulse duration.

A typical application is the submicron precise calibration of micro bore holes for nozzles of all types.

Once the spark gap has been ignited, the invention renders it possible depending upon the characteristics and number of storage elements to deliver without delay almost any short and almost any current amplitude machining pulses. The existing, limiting physical phenomena have already been discussed in the introduction. The invention renders it possible to overcome these phenomena to a great extent.

FIG. 1 illustrates a single storage element 4, 5 of a discrete delay line, comprising a printed inductance 4 and by way of example three capacitors 5. The inductance 4 is a planar air-cored coil and its inductance can be determined approximately using the following equation:

$$L=10*N^2*r^2/(2*r+2.8*d)$$

Wherein L represents the inductance of the coil in nH, N represents the number of windings of the coil, r is the outer radius of the coil in mm and d determines the thickness of the winding in mm. By way of example, a coil of N=2, r=6.5 mm and d=5.5 mm would have accordingly a typical inductance of 59.5 nH.

The storage elements 4, 5 are produced from or soldered onto a flexible printed circuit foil 1 that is coated on both sides with copper. The flexible printed circuit foil 1 can be embodied by way of example from Pyralux® AP9222R of the manufacturer DuPont™, of a synthetic material film that is only 50 μm thick. This film is highly flexible, tear proof and bend-resistant and offers insulation above 12 kV. Conductive contacting bore holes 6 can electrically connect the two-sided conductor structures.

The capacitor 5 is normally embodied from multiple surface-mountable so-called SMD ceramic capacitors that are soldered between one conductor track 2 that leads to the work piece, and one conductor track 3 that leads to the electrode.

For smaller capacitance values up to approx. 200 pF, the capacitor 5 could be embodied alternatively and in a cost-effective manner from two copper sheets that are arranged on both sides of the flexible printed circuit foil 1. A combination comprising printed capacitors and SMD capacitors can also be expedient.

It is possible using a further equation to determine approximately the capacity of two copper sheets with surface A in mm², at a spacing D in mm:

$$C=0.0085*\varepsilon_R*A/D$$

Wherein C represents the capacitance in pF, $\varepsilon_R$ represents the relative dielectric constant. If two-sided sheets A of 10 mm*20 mm, are applied at a spacing D of 0.050 mm to Pyralux® AP9222R that comprises an $\varepsilon_R$ of 3.4, then typically a capacitance C of 115.6 pF having a typical tolerance of +11%/−9% is produced together with a voltage rating of 12 kV and a loss factor at 1 MHz of 0.002.

Similar considerations can also be made for the inductor 4 that could be designed alternatively in a rectangular shape, or could be produced by means of a long conductor track for smaller values up to approx. 50 nH.

Nonetheless, SMD components should be used for higher pulse currents and higher inductance values. An additional argument for shielded SMD inductors would also be the much reduced electromagnetic radiation, since air-cored coils are always also good transmission antennae.

Figure 2:
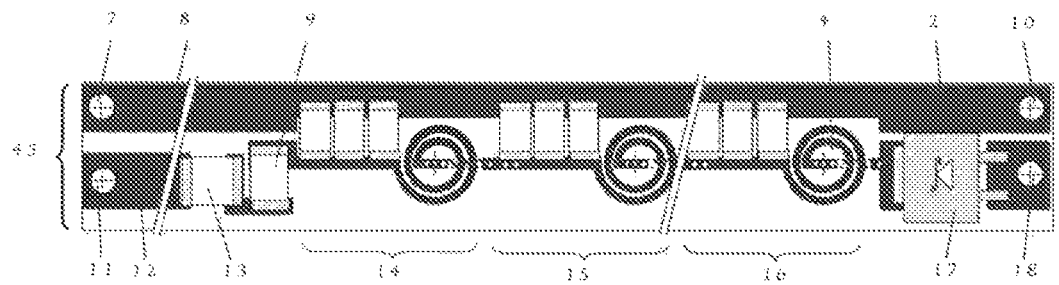
FIG. 2 illustrates a discrete delay line having a decoupling impedance and diode according to a first variant of the method in accordance with the invention.

FIG. 2 illustrates the chain-shaped arrangement of a first storage element 14, with a second storage element 15 and a final storage element 16.

A decisive factor for achieving good pulse characteristics is the fact that this chain of storage elements 14, 15, 16 and the diode 17 are arranged as close as possible to the work piece connection 10 and as close as possible to the electrode connection 18.

The final inductance 4 of the final storage element 16 in the direction of the spark gap 44 can likewise be smaller than the other inductors 4 or can even be omitted if the leakage inductance of the spark gap is significant.

Ideally, the sum of the leakage inductance and the final inductance 4 should be equal to the value of the other illustrated inductance 4 of the discrete delay line. A total value that is too low would generate a current spike at the beginning of the pulse and a pulse ripple; a total value that is too high would extend and flatten the pulse. In special cases, a mismatch of this type could even be considered as an option.

The diode 17 prevents a reversal of the discharging current at the end of a pulse. It is preferred that Schottky-diodes, in particular silicon carbide diodes, are used for this purpose, because they are practically free of a forward and a reverse recovery time. Alternatively, multiple diodes that have a lower voltage could also be connected in series, or multiple diodes that have a smaller current carrying capacity could be connected in parallel.

However, it is not necessary to provide the diode 17. Bipolar high frequency pulse trains for a first example of precision machining with a falling envelope curve according to FIGS. 9a and 9b can only be generated without a diode 17.

Figure 10A:
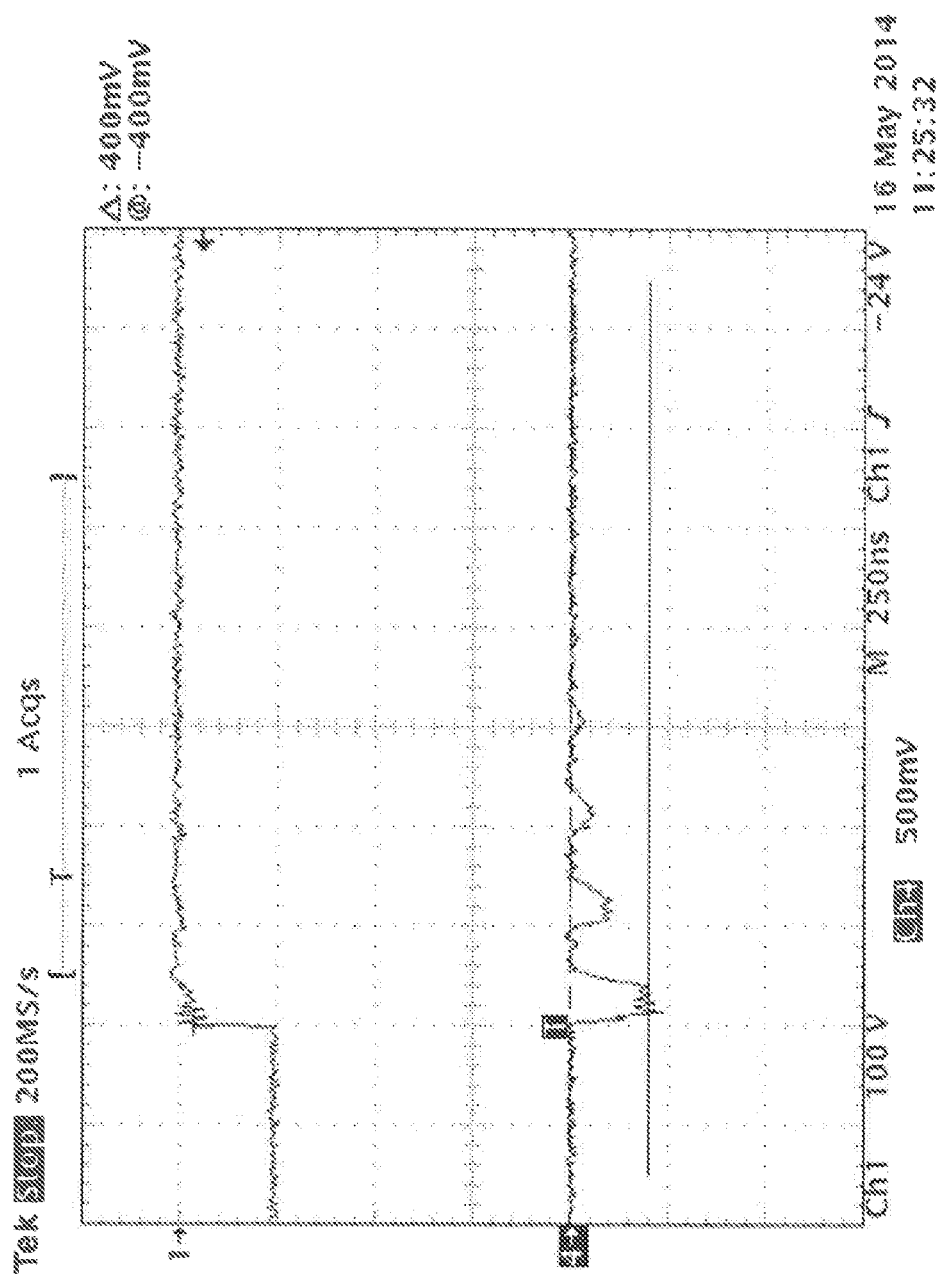
FIG. 10a illustrates an example of a pulse train with two diodes in the case of a source voltage of 100V.

Mono-polar high frequency pulse trains for a second example of precision machining with a falling envelope curve as illustrated in FIGS. 10a and 10b can comprise a diode 17 and must comprise an additional reversing diode. The reversing diode is attached between the work piece connection 10 and the final inductance 4 of the final storage element 16 in such a manner that the backward-swinging current pulse flows via the reversing diode and not via the spark gap 44.

When generating mono-polar individual pulses according to FIGS. 8a, 8b, the discrete delay line remains at an opposite poled residual voltage potential until the next charging pulse of the generator and only then is it charged in a low-loss manner to its normal polarity and subsequently re-charged in an overshoot-free manner to the normal voltage. In order to facilitate the understanding of this method, reference is made to the mentioned patent EP 1 719 570 from D'Amario.

In principle, the generator-side section of the conductor tracks 8, 12 having the generator connection 7 of the conductor track 8 to the work piece and the generator connection 11 of the conductor track 12 to the electrode can be of virtually any length.

The conductor tracks 8 and 12 can for their part indeed be a parasitic delay line that could manifest itself in the form of a post-discharging process after the pulse end of the discharging current and consequently the pulse end would deform. However, if a high characteristic impedance is selected for the line 8, 12, it can be sufficient in order to suppress the undesired effect.

As an alternative, it is also possible to insert a decoupling impedance between the first storage element 14 and the generator-side conductor track 12. The decoupling impedance advantageously comprises a resistive component and an inductive component, in other words by way of example the series connection of an SMD inductor 9 and an SMD resistor 13.

It can be further advantageous to provide a differential measuring line for detecting the voltage between the electrode 30 and the work piece 35 on the flexible printed circuit foil 1. The finest possible and symmetrical conductor tracks (fine conductor tracks) are connected by way of SMD termination resistors to the work piece connector 10 and to the electrode connection 18. A high-speed differential amplifier receives the differential signals on the generator side and subsequently transmits a signal with reference to ground to the control system.

The signal with reference to ground that in strict real time represents the voltage of the spark gap is used in an electrical discharge machine for quite different processes:

Firstly, various mean values or statistics are formed for the servo system: mean ignition delay, mean pulse voltage, number of erosion discharges, number of no-load pulses, number of short circuit pulses, etc.

Secondly, the pulse source is actively controlled on the basis of the values detected for the no-load, erosion or short circuit levels in such a manner that a no-load pulse occurs only for a pre-selected period of time (prevention of outsparking), an erosion pulse is not extended by means of the charging current and a short circuit pulse can likewise have only a preselected duration.

Thirdly, the mean values and statistics that have been filtered in this manner are used to select and optimize strategies in order to increase safety, stability and efficiency of the processes.

If the measuring line is integrated with the discrete delay line in the band-shaped feed line 45, it is quite possible to optimize the measuring line and its termination resistors to suit the respective operational cases or in special cases it is quite possible to omit said measuring line and its terminating resistance for example for precision machining at a constant feed rate.

The measuring line should for its part on the one hand transmit short pulses with an as high shape accuracy as possible and without delay. On the other hand during precision machining it is important to avoid any additional discharging currents in the spark gap 44. These two general requirements can be more easily fulfilled in accordance with the invention.

Figure 3:
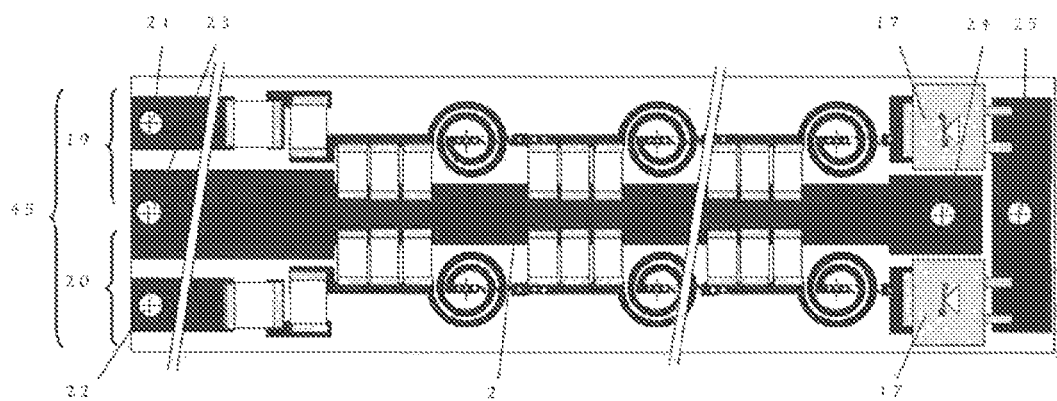
FIG. 3 illustrates a double discrete delay line according to a further variant of the method in accordance with the invention.

FIG. 3 represents a further embodiment of the invention in order to combine different pulse characteristics in one feed line 45. It can be particularly advantageous for a process of rough machining to use a delay line 19 that comprises a first characteristic (capacitor 5, inductor 4 and a number of storage elements 14 to 16) and for a polishing process to use a delay line 20 that comprises a second characteristic without exchanging the feed line.

A discrete multiple delay line of this type makes contact with a work piece 35 by way of the common work piece connection 24 and is connected on the generator side by way of the common conductor track 2 and the common generator connection 23 to the pulse source. The work piece potential is normally "quiet", in other words not disturbed by voltage steps caused by switching operations and is mainly connected to the ground potential and the machine structure. The common generator connection 23 could accordingly be additionally wired by way of a safety connection to the work piece 35, which is particularly advantageous for the embodiments according to FIGS. 6 and 7 having the sliding multiple contact units 34 to the work piece 35.

The generator in the case of multiple delay lines must be embodied accordingly in a multi-channel manner, or as an alternative must comprise an additional switching means (IGBT, MOSFET or relay) each generator connection 21, 22 to the electrode. The delay lines 19, 20 are coupled by way of the diodes 17 to the common electrode connector 25. Embodiments of this type without diodes 17 are not possible since the delay lines would no longer be separate from one another.

The delay lines can be electronically activated synchronously, individually or in groups (summation of the characteristics), or in special cases also in an alternating manner in order to achieve higher frequencies, ripples or longer pulse times.

Multiple delay lines according to FIG. 3 are particularly suitable for the installation in arm structures (in other words in carrier structures of the guide heads 31) of wire-cutting and boring machines that use an electrical discharge process. In the case of wire-cutting machines, it could be possible in many cases to omit a feed-in in the lower arm. However, it has often been demonstrated that in the case of thicker work pieces and thin electrode wires this method can cause undesired, resistance-related pulse attenuation over the work piece thickness.

Multiple advantages are also achieved by virtue of accommodating the delay lines inside arm structures: The sensitive SMD components are excellently protected against environmental influences, any possible electromagnetic radiation from the delay lines is shielded, the bending stress on the band-shaped line is eliminated, and the electrode side multiple units 27, the contact ring 28 and the flexible connections 33 according to FIG. 6 can be because the electrode-side connection 25 connected directly to the current contacts 29.

It must be mentioned that it is disadvantageous that only a limited number of discrete delay lines can be accommodated in one arm and that it is considerably more complex to replace the lines.

Figure 4:
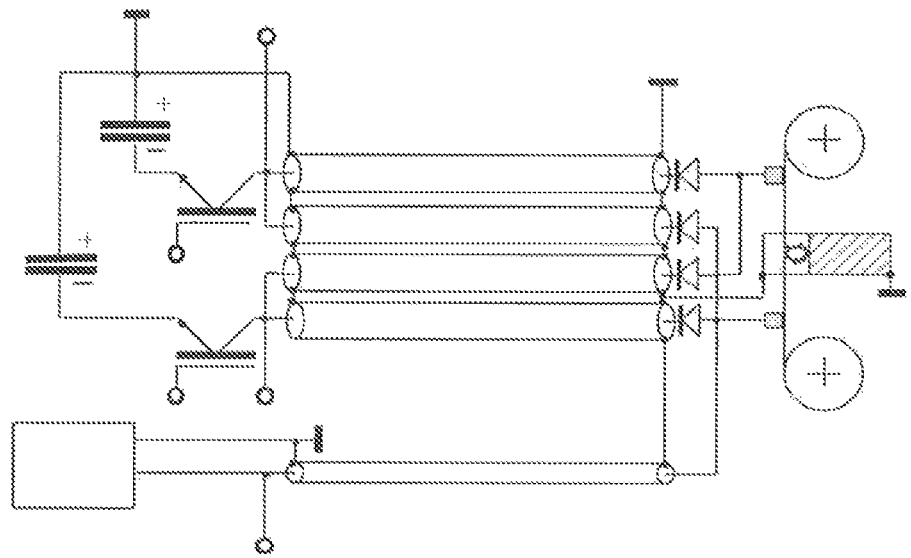
FIG. 4 illustrates a known solution disclosed in the patent EP 1 719 570 having homogenous delay lines that comprise multiple coaxial cables.
Figure 5:
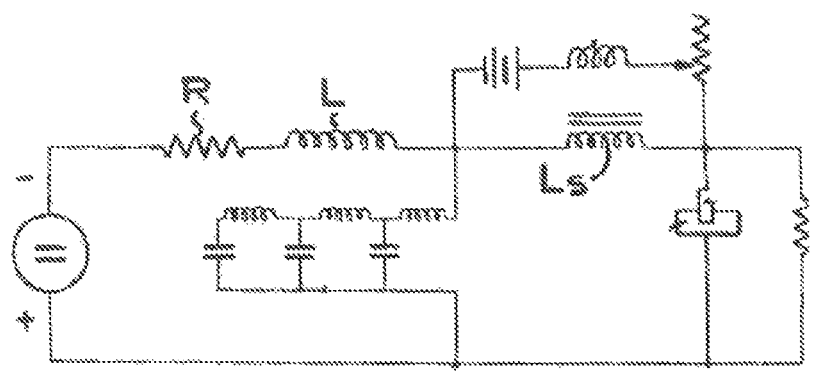
FIG. 5 illustrates a known solution disclosed in the patent U.S. Pat. No. 3,033,971 having a discrete delay line.

FIGS. 4 and 5 illustrate known solutions for homogenous and discrete delay lines. Said delay lines were discussed in the introduction in relation to the prior art.

Figure 6:
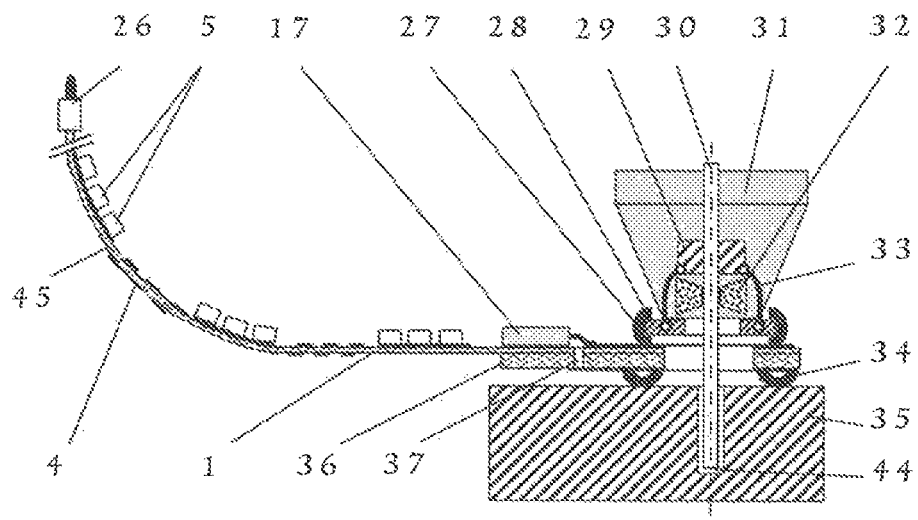
FIG. 6 illustrates an installation example of a discrete delay line for an electrical discharge drilling machine according to a further method in accordance with the invention.

FIG. 6 illustrates a solution for installing a novel discrete delay line in an electrical discharge drilling machine The flexible printed circuit foil 1 that can comprise one or multiple rigid printed circuit boards 36 having contacting bore holes 37 for reinforcement supports the SMD capacitors 5, inductors 4, the diode 17 and also the multiple contact units 27 and 34.

The multiple contact units 27, 34 are preferably toroidal contact springs and are arranged in a coaxial manner around the electrode 30. This extremely short and coaxial connection makes an important contribution to reducing the interfering leakage inductance.

The multiple contact units 27, 34 are further embodied so as to comprise a plurality of independent contact sites in order to divide the pulse current into as many paths as possible. It is not absolutely necessary for the multiple contact units 27, 34 to be produced from sheet metal, brush-type embodiments or wire-shaped springs can also comprise interesting characteristics. This particularly applies to the work piece-side multiple contact unit 34 since the surface of the work piece 35 must not be damaged under any circumstances.

The multiple contact units 27, 34 should preferably comprise the following material characteristics: high electrical conductivity, elastic, abrasion-resistant, hard and should be located as close as possible in the electrochemical voltage series as the work piece 35 respectively as the contact ring 28. It can therefore also be advantageous for this argument to provide different delay lines for different requirements.

A multi-pole generator-side plug connector 26 renders it possible to rapidly manually replace the discrete delay lines. The electrode-side multiple contact unit 27 can latch in or out of a contact ring 28 in a mechanical manner and simultaneously produce a low-ohmic electrical contact. The round shape of the contact ring 28 renders it possible to align the delay lines in any direction.

Naturally, a plurality of alternative retaining principles is feasible. Thus, by way of example, electromagnetic, permanently magnetic, pneumatic, hydraulic or retaining forces that are generated by means of a vacuum can also be used.

The multiple contact units 27 and 34 can also be designed in such a manner that they can also be mounted automatically like the other SMD components 5, 9, 13, 17. As ultimate result, discrete delay lines that are produced in this manner are very cost-effective and can be used without any problem as mass-produced items or as parts subject to wear, which is particularly relevant for the printed versions.

Although the delay lines do preferably hang in the dry region above the working space, nonetheless the electronic components 5, 9, 13, 17 should be protected from liquids and environmental influences. A soft-elastic polyurethane lacquer is by way of example very suitable for this purpose.

The contact ring 28 also has an additional role, it must prevent mechanical forces of the delay line acting on the guide head 31. The contact ring 28 is mechanically decoupled from the guide head 31, in other words it is preferably held by an additional carrier and is connected to the structure of the machine. The electrical connection to the current contacts 29 of the electrode is produced by means of multiple flexible current connections 33.

The electrode guide 32 is normally arranged between the current contacts 29 of the electrode 30 and the work piece 35. In many cases, the two functions could be combined in that a conductive electrode guide would be connected to the flexible current connections 33 in lieu of the electrode guide 32. The interfering parasitic leakage inductance of the pulse feed-in could as a result be further reduced and would accordingly render possible even steeper pulses.

Figure 7:
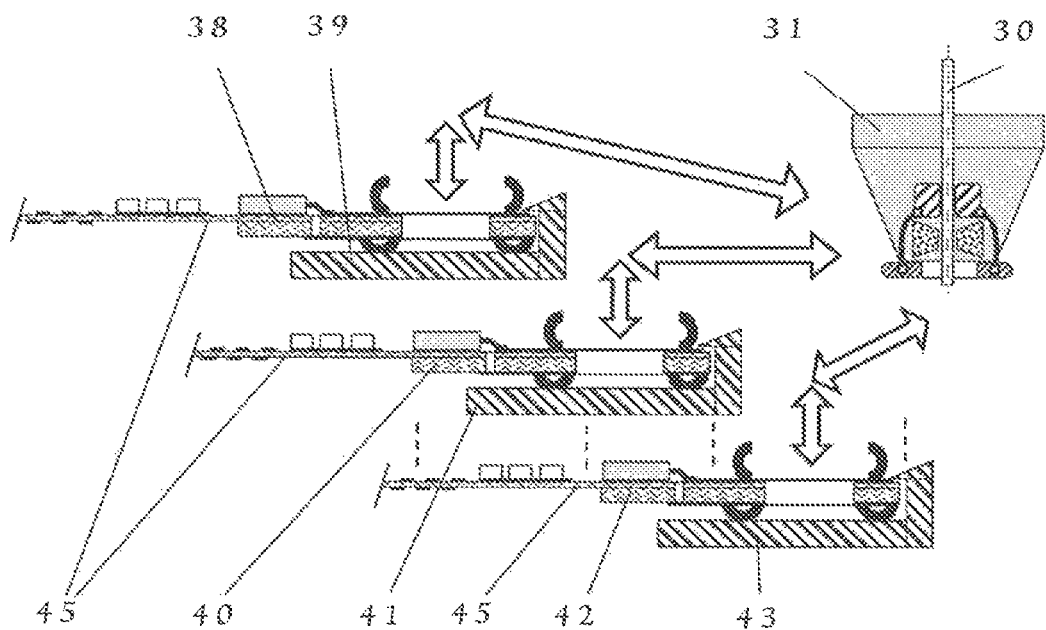
FIG. 7 illustrates an example of the integration in an electrical discharge drilling machine, suitable for the automatic exchange of multiple discrete delay lines according to a further method in accordance with the invention.

FIG. 7 illustrates likewise for an electrical discharge drilling machine a second principle in order to be able to activate different pulse characteristics. An automatic substitution of delay lines 38, 40, 42 having different characteristics renders possible ideally stepped processing regimes. For the special case of mass production of precision parts, identical sets of delay lines 38, 40, 42 could be kept ready in order to increase the autonomy of the production line in the event that the delay lines were subjected to wear.

Multiple parking devices 39, 41, 43 are arranged, preferably in a semi-circle, around the guide head 31 and fixedly connected to the machine bench. The parking devices 39, 41, 43 comprise for example a rail-shaped structure and have an encompassing recess on at least one side. Pre-programmed sequences of movements (symbolized as arrows) of the machine axes X, Y, Z and in the case of the electrode 30 being drawn back render it possible for the delay lines 38, 40, 42 to latch with the guide head 31 and for them to be removed from the parking devices 39, 41, 43 by means of being drawn out of the encompassing recess. Conversely, delay lines 38, 40, 42 can be parked in the parking devices 39, 41, 43 and as a result of the encompassing recess they can be detached or unlatched from the guide head 31. The automatic procedure of substituting a delay line typically takes only a few seconds. Naturally, the pulse source must be switched over on the generator side by way of electromechanical or electric switching devices to the delay line that has been substituted in.

The FIGS. 8*a* to 10*b* illustrate different discharging pulses using as an example one discrete line that is the same for all figures and comprises five storage elements 14, 15, 16 with capacitors 5 of 470 pF, inductors 4 of 235 nH.

The inductors 4 have been built up from two shielded SMD inductors of the type WE TPC 470 nH/4.7 A saturation current manufactured by the company Würth, Germany. These inductors have a diameter of 3 mm and an overall height of 2.8 mm and they currently cost approx. 0.36 Euro per item.

The variations are: FIG. 8 with a diode 17, FIG. 9 without a diode 17, FIG. 10 with a diode 17 and an additional reversing diode, and in the case of source voltages of a: 100V and b: 200V.

Theoretically, this delay line has a characteristic impedance of Z=22.4 Ohm and a fundamental delay time of 21 ns, in other words for 5 storage elements 14, 15, 16, 105 ns (a measurement of 114 ns was achieved).

In the case of the source voltage of 100V, a current amplitude of 4.47 A would be expected in the event of a short circuit for all variants (a measurement of 3.8 A to 4.1 A was achieved) and a current amplitude of 3.35 A would be expected in the case of a spark voltage of 25V. The current increase at the beginning of the pulse would theoretically be 0.426 A/ns in the case of a short circuit (a measurement of 0.25 A/ns was achieved) and 0.319 A/ns in the case of a 25V spark voltage.

In the case of the source voltage of 200V, a current amplitude of 8.94 A would be expected (a measurement of 7.7 A to 8.0 A was achieved) and a current amplitude of 7.83 A would be expected in the case of a spark voltage of 25V. The current increase at the beginning of the pulse would theoretically be 0.851 A/ns in the case of a short circuit (a measurement of 0.34 A/ns was achieved) and 0.745 A/ns in the case of a 25V spark voltage.

The measurement values quoted in brackets could not be verified on an electrical discharge machine without feedback effects from the measuring device. If for example a current measuring device were to be incorporated into the flexible current connection 33, or if a current probe were to be closed around the electrode 30, the increase in leakage inductance would be unacceptably high and the measurement values would be unrealistic.

For this reason, the measurements according to FIGS. 8*a* to 10*b* were determined in a laboratory set-up. Using the shortest possible lines, a 1-ohm measuring resistor, a mercury-wetted switch and a P6021 current probe manufactured by the company Tektronix, USA were connected in series between the work piece connection 10 and the electrode connection 18. The bounce-free mercury-wetted switch simulates with an almost unlimited steep voltage flank realistically the breakdown in the spark gap. The switch is operated in this case only with a repetition frequency of approx. 1 Hz.

To summarize, it can be said that this set-up does in fact contribute approx. 200 nH leakage inductance which to a great extent explains the slightly poorer measurement values. The two different current measuring methods using a measuring resistor and a current probe produce good matching results.

In detail, FIG. 8*a* illustrates for a 100V source voltage, with a diode 17, the channels:

CH1: voltage 100V/div at the output of the final storage element 16,

CH2: voltage 100V/div at the electrode connection 18,

CH3: voltage at the measuring resistor 5V/div filtered with a band width of 20 MHz, and CH4: the current probe with 5 A/div.

Figure 8B:
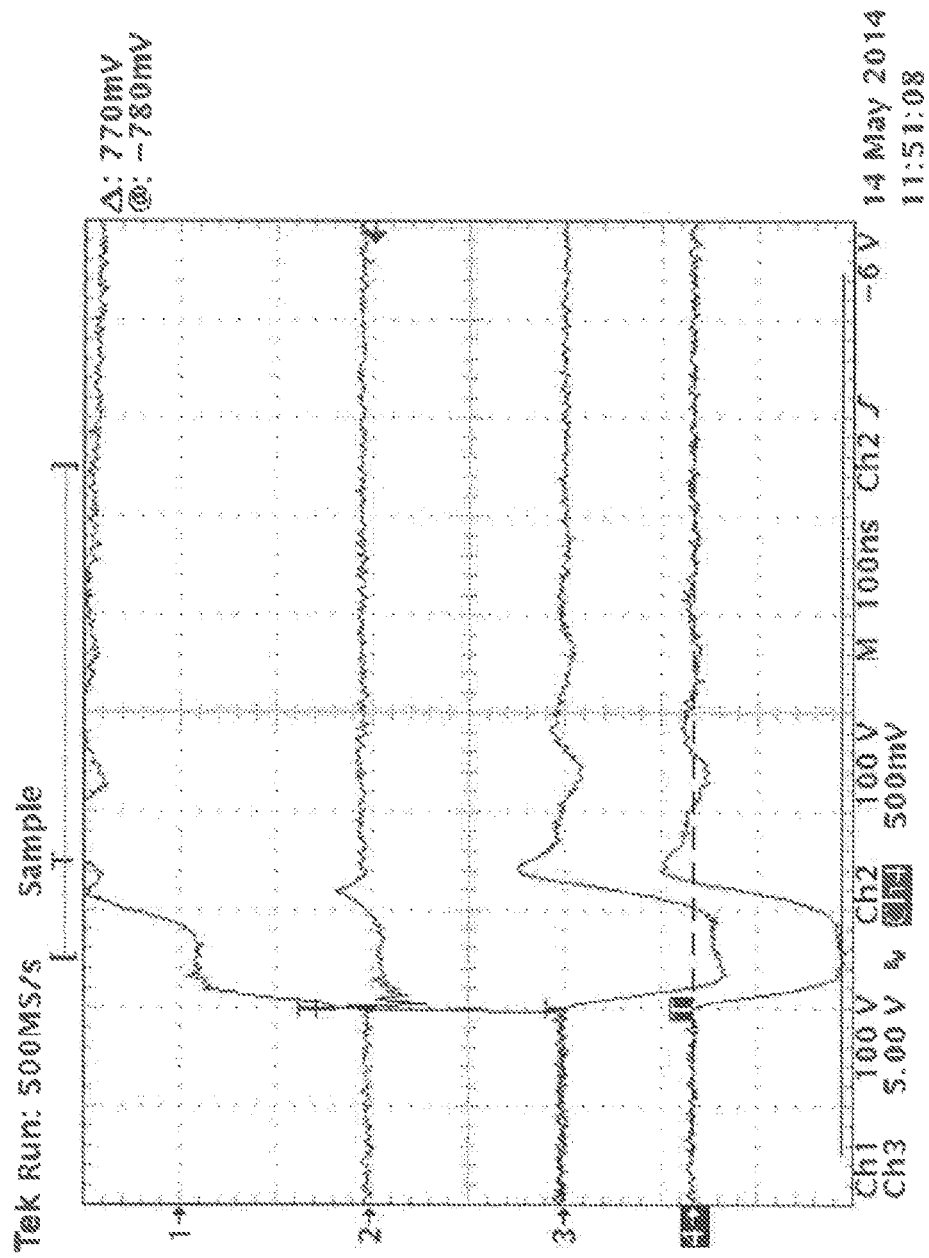
FIG. 8b illustrates an example of a discharge pulse having a diode in the case of a source voltage of 200V.

FIG. 8*b* illustrates for a 200V source voltage, with a diode 17, the channels:

CH1: voltage 100V/div at the output of the final storage element 16,
CH2: voltage 100V/div at the electrode connection 18,
CH3: voltage at the measuring resistor 5V/div filtered with a band width of 20 MHz, and
CH4: the current probe with 5 A/div.

Figure 9A:
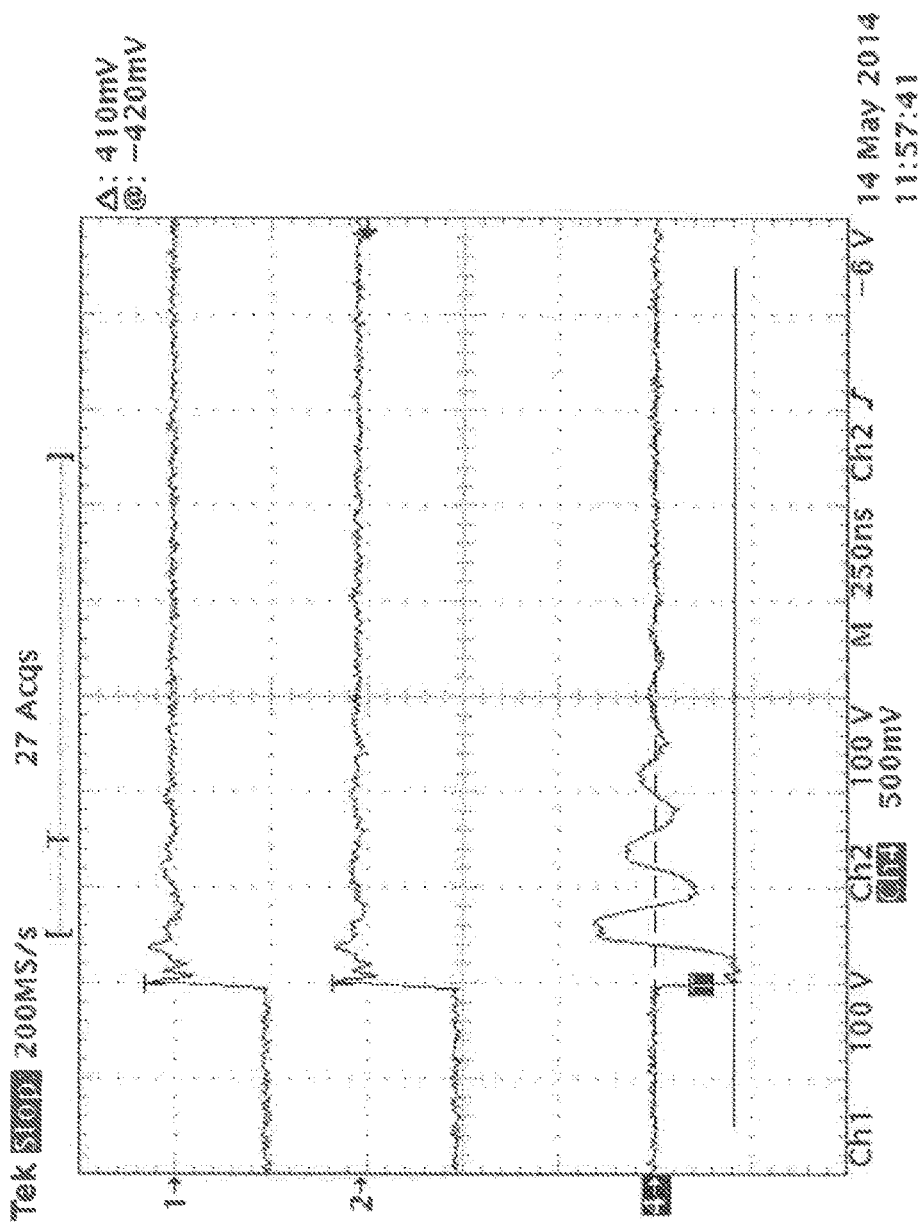
FIG. 9a illustrates an example of a pulse train without a diode in the case of a source voltage of 100V.

FIG. 9a illustrates for a 100V source voltage, without a diode 17, the channels:
CH1: voltage 100V/div at the output of the final storage element 16,
CH2: voltage 100V/div at the electrode connection 18, and
CH4: the current probe with 5 A/div.

Figure 9B:
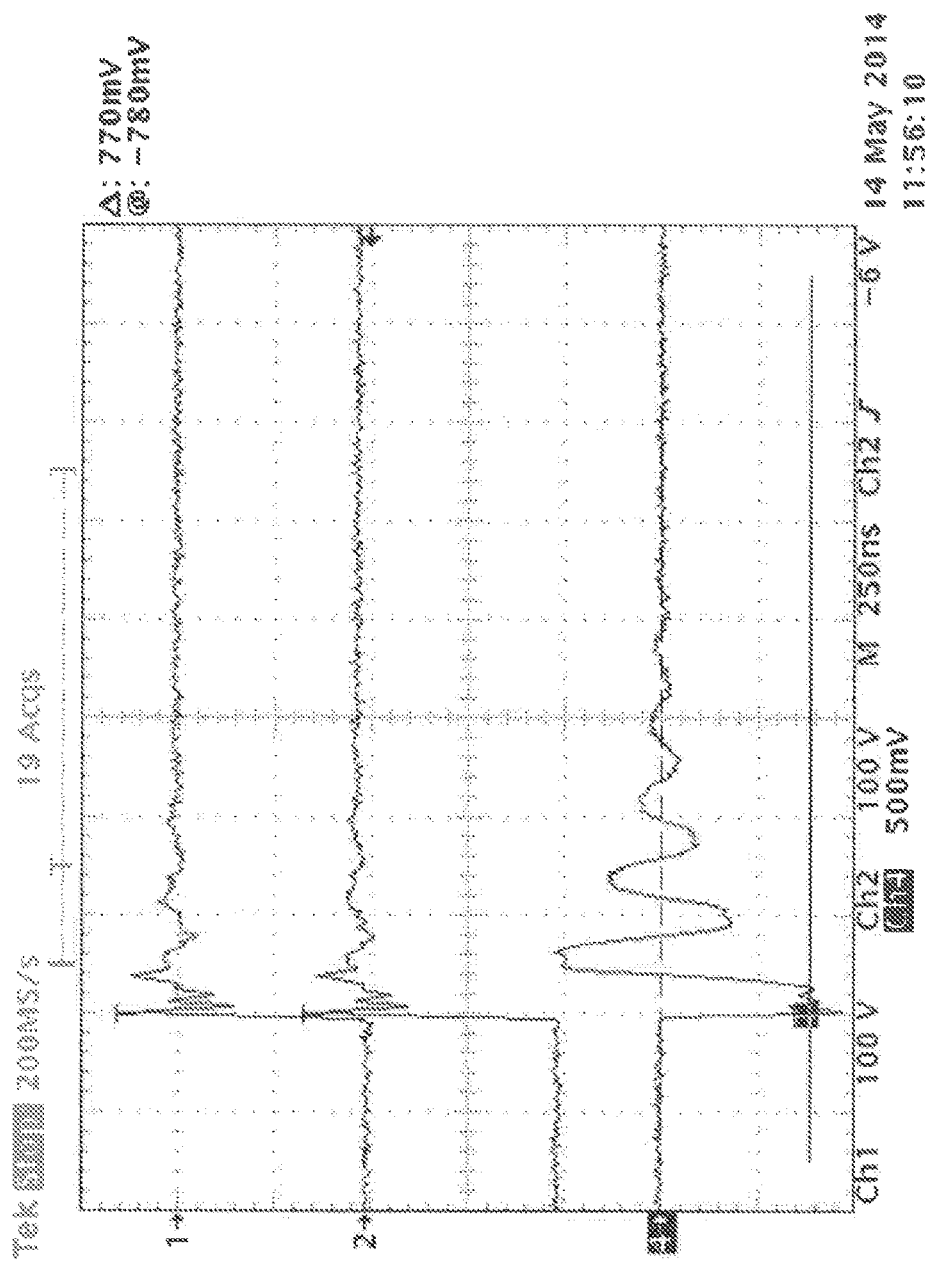
FIG. 9b illustrates an example of a pulse train without a diode in the case of a source voltage of 200V.

FIG. 9b illustrates for a 200V source voltage, without a diode 17, the channels:
CH1: voltage 100V/div at the output of the final storage element 16,
CH2: voltage 100V/div at the electrode connection 18, and
CH4: the current probe with 5 A/div.

FIG. 10a illustrates for a 100V source voltage, with a diode 17 and a reversing diode, the channels:
CH1: voltage 100V/div at the electrode connection 18 and
CH4: the current probe with 5 A/div.

FIG. 10b illustrates for a 200V source voltage with a diode 17 and a reversing diode, the channels:
CH1: voltage 100V/div at the electrode connection 18 and
CH4: the current probe with 5 A/div.

In order to generate steeper pulses of an identical duration and amplitude, the number of storage elements must be increased. With by way of example 24 storage elements having capacitors 5 of 100 pF and inductors 4 of 50 nH (values that are well suited for a printed embodiment), the identical characteristic impedance of $Z=22.4$ Ohm would theoretically be achieved but a fundamental delay time of only 4.47 ns and accordingly for 24 storage elements 107 ns.

The pulse rise and fall time would theoretically be reduced from 10.5 ns to 2.235 ns, in other words corresponding to the half fundamental delay time, which is however only possible if the leakage inductance to the spark gap can be maintained within 50 nH.

This requirement can obviously be fulfilled using the coaxial feed-in in accordance with the invention by way of multiple contact units 27, 34 on the guide head 31 and the work piece 35 but unfortunately cannot be measured without a feedback effect, as already mentioned above.

Current pulses for the electrical discharge machining process with almost any amplitude and with pulse durations of less than 10 ns consequently move for the first time into the realm of the possible.

There are many other solutions and variants for embodiments of discrete delay lines, of multiple contact units and parking devices in the sense of and purpose of the claimed features. The mentioned examples serve only to facilitate the understanding of the invention and are therefore to be understood as not limiting.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS

1 Flexible printed circuit foil
2 Conductor track—Work piece
3 Conductor track—Electrode
4 Inductance
5 SMD capacitors
6 Contacting bore holes
7 Generator connection—Work piece
8 Generator-side conductor track—Work piece
9 SMD inductance
10 Work piece connection
11 Generator connection—Electrode
12 Generator-side conductor track—Electrode
13 SMD resistor
14 First storage element
15 Second storage element
16 Final storage element
17 Diode
18 Electrode connection
19 Delay line with a first characteristic
20 Delay line with a second characteristic
21 Generator connection—Electrode with a first characteristic
22 Generator connection—Electrode with a second characteristic
23 Common generator connection—Work piece
24 Common work piece connection
25 Common electrode connection
26 Multi-pole plug connector
27 Electrode-side multiple contact unit
28 Contact ring
29 Current contact of the electrode
30 Electrode
31 Guide head
32 Electrode guide
33 Flexible current connections
34 Work piece-side multiple contact unit
35 Work piece
36 Rigid printed circuit boards
37 Contacting bore hole to the conductor foil
38 First delay line
39 First parking device
40 Second delay line
41 Second parking device
42 Final delay line
43 Final parking device 44 Spark gap
45 Feed line

What is claimed is:

1. A method for electrical discharge machining a work piece using rectangular processing pulses, comprising:
    forming the rectangular processing pulses by discharging one or multiple discrete delay lines that comprise multiple storage elements; and
    electrical discharge machining the work piece using the rectangular process pulses,
    wherein the storage elements are arranged as part of a feed line to a spark gap on a section of the feed line near the spark gap,
    wherein the discrete delay lines are connected to a guide head by an electrode-side contact unit and are connected to the work piece by a work piece-side contact unit, and
    wherein the storage elements are connected in series and comprise, respectively, at least one capacitor and at least one inductance, the capacitor being inserted into the delay line in a parallel manner and the inductance being inserted into the delay line in series in a direction towards the spark gap after the capacitor.

2. The method of claim 1, wherein the feed line is band-shaped and flexible and comprises at least one of printed conductor tracks, printed components, or SMD components that are configured to be surface-mountable.

3. The method of claim 2, wherein the feed line comprises fine conductor tracks and termination resistors configured to measure a pulse voltage and to detect an electrical discharge or a short circuit.

4. The method of claim 3, further comprising measuring the processing pulses and,
    when an electrical discharge is detected, aborting a charging pulse of a pulse source, and
    when an electrical discharge is not detected or a short circuit is detected, aborting the charging pulse after the previously defined pulse durations, and
    subsequently discharging the storage elements using the pulse source.

5. The method of claim 1, wherein the electrode-side contact unit and the work piece-side contact unit comprise multiple contact units and are formed in a toroidal manner.

6. The method of claim 1, wherein the multiple discrete delay lines comprise multiple parallel discrete delay lines, the multiple parallel discrete delay lines being activated either individually, alternately, or in parallel by a pulse source.

7. The method of claim 1, wherein on an electrode side the discrete delay lines comprise one or multiple diodes, and the diodes are Schottky- or silicon carbide diodes and are inserted in a flow direction of the rectangular pulse.

8. The method of claim 1, wherein on an electrode side the discrete delay lines do not comprise a diode, and an inductance of a final storage element is connected directly to an electrode connection so as to generate bipolar pulse trains with a falling envelope curve.

9. The method of claim 1, wherein on an electrode side the discrete delay lines comprise one or multiple diodes, at least one of which is connected between an inductance of a final storage element and an electrode connection so as to generate individual rectangular pulses.

10. The method of claim 9, further comprising a reversing diode inserted between a work piece connection and the inductance of the final storage element such that a reversing current pulse is configured to flow via the reversing diode so as to generate mono-polar pulse trains with a falling envelope curve.

11. The method of claim 1, wherein the multiple discrete delay lines are held ready on multiple parking devices in a working area, wherein a specific discrete delay line is connected to the guide head by the electrode-side multiple contact unit and by pre-programmed axis movements, and wherein said discrete delay lines are configured to removed from a parking device or stored in a parking device.

12. A pulse-forming device for electrical discharge machining a work piece using rectangular processing pulses that are transmitted from a generator, comprising:
    one or multiple discrete delay lines configured to transmit the rectangular processing pulses from the generator to a spark gap between the work piece and an electrode,
    wherein the discrete delay lines comprise multiple storage elements,
    wherein the discrete delay lines are arranged as part of a feed line on a section directly adjoined to the spark gap,
    wherein the discrete delay lines are connected to a guide head by an electrode-side contact unit and to the work piece by a work piece-side contact unit, and
    wherein the storage elements are connected in series and comprise, respectively, at least one capacitor and at least one inductance, the capacitor being inserted into the delay line in a parallel manner and the inductance being inserted into the delay line in series in a direction towards the spark gap after the capacitor.

13. The pulse-forming device of claim 12, wherein the inductance of a final storage element in the direction towards the spark gap is selected in such a manner that summated with a leakage inductance of the spark gap, the identical inductance is produced as that of the remaining storage elements in the discrete delay lines.

14. The pulse-forming device of claim 12, wherein at least one of: the storage elements comprise at least one of SMD components that are configured to be surface-mountable; the capacitors comprise double-sided printed conductor surfaces; or the inductances comprise coil-type printed conductor tracks.

15. The pulse-forming device of claim 12, wherein the feed line is a band-shaped, comprises a flexible printed circuit foil, and comprises multiple parallel discrete delay lines.

16. The pulse-forming device of claim 15, wherein the discrete delay lines are configured to be activated either individually, alternately, in groups of a multi-channel pulse source, or by additional switching elements.

17. The pulse-forming device of claim 15, wherein the storage elements comprise at least part of a band-shaped and flexible printed circuit foil in a printed or surface-mounted form on an electrode-side end of the band-shaped and flexible printed circuit foil.

18. The pulse-forming device of claim 17, wherein the band-shaped and flexible printed circuit foil is connected to a pulse source by a multi-pole plug connector.

19. The pulse-forming device of claim 17, wherein at least one of the electrode-side contact unit or the work piece-side contact unit comprises SMD components that are configured to be surface-mountable, and that in areas of increased mechanical loading the band-shaped and flexible printed circuit foil is at least one of reinforced with rigid printed circuit boards or connected to the band-shaped and flexible printed circuit foil by contacting bore holes.

20. The pulse-forming device of claim 12, wherein the work piece-side contact unit is one of multiple contact units or sliding contacts or brush contacts that are arranged in a coaxial manner around the electrode.

21. The pulse-forming device of claim 17, wherein the feed line or multiple feed lines with discrete delay lines are guided inside an arm structure of an electrical discharge machine and are connected on an electrode-side directly to current contacts of the electrode in the guide head and are connected on a work piece-side by the work piece-side contact unit or multiple work piece-side contact units.

22. The pulse-forming device of claim 12, wherein the electrode-side contact unit comprises multiple toroidal electrode-side contact units that are configured to latch with a contact ring arranged below the guide head or are configured to be held in a magnetic, hydraulic, or pneumatic manner, or by a vacuum, and wherein the contact ring is mechanically isolated from the guide head and is connected to one or more current contacts of the electrode by multiple flexible current connections.

23. The pulse-forming device of claim 22, wherein multiple discrete delay lines are held ready on multiple parking devices in a working area, wherein the discrete delay lines are connected by electrode-side multiple contact units and are connected thereto by pre-programmed axis movements of the guide head, and wherein the multiple discrete delay lines are configured to be removed from a parking device or stored in a parking device.

24. The pulse-forming device of claim 23, wherein one or more parking devices are arranged in a semi-circle around the guide head so as to receive multiple band-shaped and flexible feed lines.

* * * * *